(12) United States Patent
Matsuo et al.

(10) Patent No.: US 9,107,382 B2
(45) Date of Patent: Aug. 18, 2015

(54) LIQUID-PERMEABLE PANEL

(75) Inventors: Takayuki Matsuo, Kagawa (JP);
Tomoko Hirao, Kagawa (JP)

(73) Assignee: Uni-Charm Corporation, Ehime (JP)

( * ) Notice: Subject to any disclaimer, the term of this patent is extended or adjusted under 35 U.S.C. 154(b) by 7 days.

(21) Appl. No.: 13/806,261

(22) PCT Filed: Jun. 24, 2011

(86) PCT No.: PCT/JP2011/064548
§ 371 (c)(1),
(2), (4) Date: Dec. 21, 2012

(87) PCT Pub. No.: WO2011/162379
PCT Pub. Date: Dec. 29, 2011

(65) Prior Publication Data
US 2013/0098302 A1    Apr. 25, 2013

(30) Foreign Application Priority Data
Jun. 25, 2010    (JP) ................................. 2010-145702

(51) Int. Cl.
*A01K 1/01*    (2006.01)
(52) U.S. Cl.
CPC .............. *A01K 1/0107* (2013.01); *A01K 1/0114* (2013.01)
(58) Field of Classification Search
CPC . A01K 1/0107; A01K 1/0114; A01K 1/0157; A01K 15/024
USPC ......... 119/161, 165, 166, 167, 169, 529, 530; 449/4
IPC ........................... A01K 29/00, 1/03, 1/01, 1/035
See application file for complete search history.

(56) References Cited

U.S. PATENT DOCUMENTS 5,353,743 A * 10/1994 Walton .......................... 119/166
5,465,686 A * 11/1995 Monetti et al. ................. 119/168
(Continued)

FOREIGN PATENT DOCUMENTS

JP    H07-505519 A    6/1995
JP    2593792    *    3/1997    ............. A01K 1/015
(Continued)

OTHER PUBLICATIONS

Machine translation of JP 2003-164234 to Mori, published Jun. 2003.*

(Continued)

*Primary Examiner* — Kathleen Alker
(74) *Attorney, Agent, or Firm* — Brinks Gilson & Lione (57) ABSTRACT

A liquid-permeable panel is mounted on a portion of a system toilet for animals, and a 15-degree bending strength defined below the liquid-permeable panel is at least 0.2 N and no greater than 10 N. The 15-degree bending strength is the load that is applied at a velocity of 500 mm/min to the central section of the liquid-permeable panel from the direction perpendicular to a plan view using a round plunger having a diameter of 8 mm, while both sides in the Y-direction in a plan view of the liquid-permeable panel are being supported, that deforms the liquid-permeable panel into the shape of a concavity along the X-direction such that, in a cross section of the concavity, the angle (θ) formed by a horizontal line that contains the bottommost point of the concavity and an oblique line linking the aforementioned bottommost point and either of the aforementioned both sides is 15 degrees.

4 Claims, 7 Drawing Sheets

(56) References Cited

U.S. PATENT DOCUMENTS

| | | | |
|---|---|---|---|
| 5,615,639 A | 4/1997 | Knight | |
| 7,584,717 B2 * | 9/2009 | Skovron et al. | 119/165 |
| 2003/0116095 A1 | 6/2003 | Otsuji | |
| 2003/0150393 A1 | 8/2003 | Otsuji et al. | |
| 2007/0068461 A1 * | 3/2007 | Hill | 119/166 |
| 2012/0006275 A1 * | 1/2012 | Brenner | 119/169 |

FOREIGN PATENT DOCUMENTS

| | | | | |
|---|---|---|---|---|
| JP | 2002-142599 A | 5/2002 | | |
| JP | 2003-164234 | * 6/2003 | | A01K 13/00 |
| JP | 2003-180182 A | 7/2003 | | |
| JP | 3609855 B | 10/2004 | | |
| JP | 2006-000044 A | 1/2006 | | |
| JP | 3127391 U | 11/2006 | | |

OTHER PUBLICATIONS

International Search Report based on corresponding PCT application No. PCT/JP2011/064548 dated Jul. 26, 2011 (4 pgs.).

* cited by examiner

LIQUID-PERMEABLE PANEL

RELATED APPLICATION

This application is a 35 U.S.C. §371 national phase filing of International Patent Application No. PCT/JP2011/064548 filed Jun. 24, 2011, to which priority is claimed under 35 U.S.C. §120 and through which priority is claimed under 35 U.S.C. §119 to Japanese Patent Application No. 2010-145702, filed Jun. 25, 2010.

TECHNICAL FIELD

The present invention relates to a disposable liquid-permeable panel used, for example, in a system toilet for animals such as a dog.

BACKGROUND ART

A toilet for animals which can be disposed in a room is used in order to manage excrement of an animal that inhabits the room. Recently, toilets for animals include an animal toilet in which a commercially available pee pad for toilet use is laid directly onto the floor surface, or is fixed by an outer frame by pressing the outer periphery of the pee pad (Patent Document 1), and an animal system toilet in which a shallow toilet pan contains a plate-shaped urine-absorbent mat and a liquid-permeable non-woven fabric that is tightly attached to and covers the whole upper surface of the urine-absorbent mat (Patent Document 2).

When feces are excreted by an animal onto a liquid-permeable member such as a non-woven fabric or the like that is disposed on an uppermost section, a system toilet for animals as disclosed in Patent Document 2 is often configured so that a member such as a non-woven fabric on which feces are disposed is removed, the feces are carried for disposal to a disposal location such as a toilet, and the non-woven fabric is reused. The weight of the feces at this time cannot be ignored since the amount on one occasion reaches several tens of grams. During the disposal operation in the above configuration, that is to say, when the travel from the system toilet to the disposal location is considered, the feces may easily fall from the non-woven fabric unless both ends of the soft non-woven fabric or the like are held in both hands, pulled with a suitable force to thereby maintain a delicate horizontal balance during carrying.

Although there have been proposals to wrap and carry the feces in the non-woven fabric, since the feces become attached to the entire surface of the non-woven fabric, reuse of the non-woven fabric is not possible. Furthermore, extremely complicated operations are required in order to wrap up, and unwrap, the non-woven fabric. The same problem arises when disposing of feces in using a pee pad and not a system toilet.

Patent Document 1: Japanese Patent Publication No. 3609855
Patent Document 2: Japanese Unexamined Patent Application, Publication No. 2002-142599

DISCLOSURE OF THE INVENTION

Problems to be Solved by the Invention

Since the disadvantages in portability and disposal characteristics when feces are attached as described above result from basic disadvantages of a low rigidity member essentially, no investigations have been made to improve such disadvantages.

The present invention has the object of providing a liquid-permeable panel for a system toilet for animals that avoids a risk of falling of feces during disposal of the feces and that avoids complicated operations.

Means for Solving the Problems

The present inventors conducted diligent research to solve the above problems. As a result, the present invention was completed with the insight that the risk of falling of feces during disposal of the feces and complicated operations can be avoided by configuring a liquid-permeable panel exhibiting predetermined liquid-permeable characteristics to have the bending strength in one direction of the liquid-permeable panel to facilitate suitable bending in a predetermined range. More specifically, the present invention includes the following features.

(1) In a liquid-permeable panel mounted on a portion of a system toilet for animals on which an animal directly stands, a 15-degree bending strength in one direction of a plan view of the liquid-permeable panel as defined below is at least 0.2 N and no greater than 10 N.

"A 15-degree bending strength is a load that is applied at a velocity of 500 mm/min to a central section of the liquid-permeable panel from a direction perpendicular to a plan view using a round plunger of which a tip has a diameter of 8 mm, while both sides that face each other in the plan view of the liquid-permeable panel are being supported, and that deforms the liquid-permeable panel into a shape of a concavity along a bending direction that is orthogonal to a direction of both side of the liquid-permeable panel, such that, in a cross section of the concavity, the angle θ formed by a horizontal line that contains a bottommost point of the concavity and an oblique line linking the bottommost point and either of both sides is 15 degrees."

(2) According to the liquid-permeable panel as described in (1), a bending shape retention withstand load in relation to both side directions as defined below is at least 50 g in a configuration in which a first end of both sides that face each other is supported, and the concavity is formed such that θ is 15 degrees when viewed in the cross section.

"Bending shape retention withstand load: a weight is placed in the central section within 12 cm from a side end of a sample on an opposite side to the first end, such that the load causes θ to be less than 15 degrees when the concavity on the opposite side is viewed in the cross section. Alternatively, the bending shape retention withstand load is a load causing a bending configuration along an axial direction to intersect perpendicularly with the bending direction."

(3) According to the liquid-permeable panel as described in (1) or (2), the liquid-permeable panel has a corrugated honeycomb structure with a predetermined thickness that is obtained by cutting a porous corrugated block formed by lamination of a corrugated sheet and a flat sheet with reference to a direction that is perpendicular to the direction of penetration of holes, and the bending direction is a direction that is orthogonal to a direction of disposition of the flat sheet when the liquid-permeable panel is viewed in plan.

(4) A system toilet for animals includes: an excrement receptacle including an excrement containment section; and the liquid-permeable panel according to any one of (1) to (3) configured to be detachable with respect to the excrement containment section.

Effects of the Invention

According to the present invention, a liquid-permeable panel for a system toilet for animals is provided that avoids a risk of falling of feces during disposal of the feces and that avoids complicated operations in relation to use of the toilet for animals.

PREFERRED MODE FOR CARRYING OUT THE INVENTION

The preferred aspects of the present invention will be described below making reference to the figures. The embodiments of the present invention are not limited in any manner to the following embodiments, nor is the technical scope of the present invention limited thereby.

Overall Structure

Firstly the overall structure of a system toilet 1 for animals will be described making reference to the system toilet 1 for animals that is an embodiment of the present invention.

Figure 1:
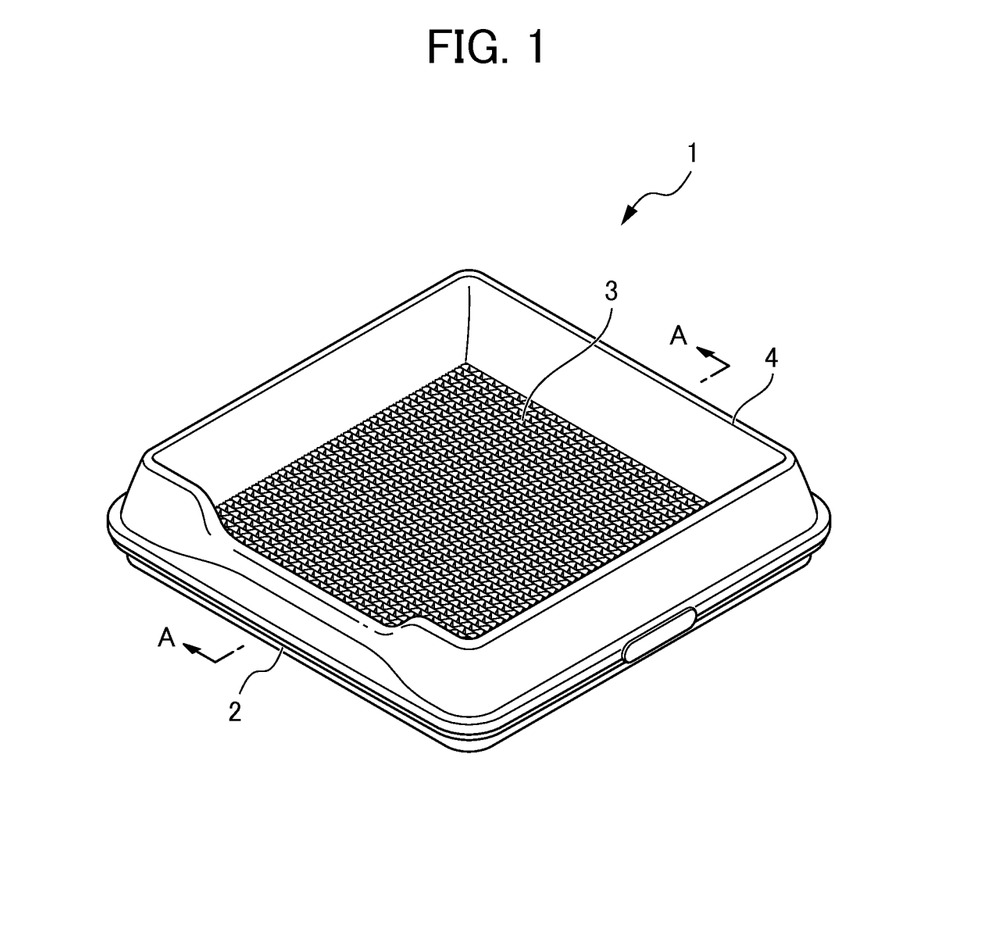
FIG. 1 is a perspective view of a system toilet for animals according to the present embodiment.
Figure 2:
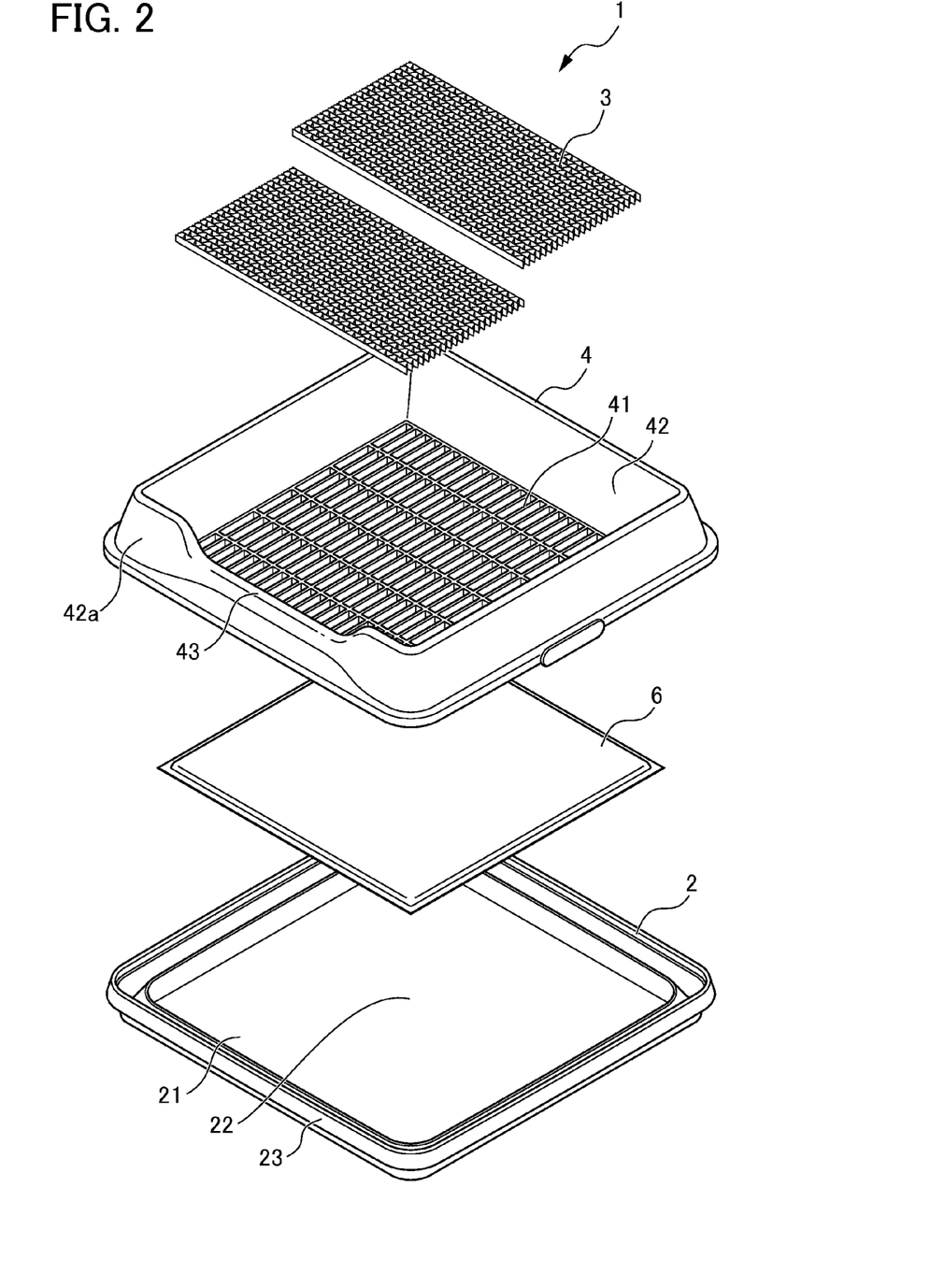
FIG. 2 is an exploded perspective view illustrating the system toilet for animals according to the present embodiment.

As illustrated in FIG. 1 and FIG. 2, the system toilet 1 for animals according to the present embodiment includes an excrement receptacle 2 that opens at a upper surface; an upper receptacle 4 that is disposed on an upper section of the excrement receptacle 2; and a liquid-permeable panel 3 that is disposed (mounted) on the bottom surface section 41 of the upper receptacle 4. The excrement receptacle 2 has an excrement containment section 21 that can contain an absorbent member that exhibits water-absorbent characteristics such as an absorbent sheet 6 or the like. The upper receptacle 4 includes a bottom surface that is configured to cover the open upper surface of the excrement receptacle 2

As illustrated in FIG. 2, the excrement receptacle 2 includes a substantially square bottom surface section 22 and four side wall sections 23 that rise from the four sides of the bottom surface section with a predetermined rise angle with respect to the bottom surface section 22. The excrement containment section 21 is formed by the space enclosed by the bottom surface section 22 and the four side wall sections 23. The excrement containment section 21 can contain urine or the like that is excreted by an animal.

Figure 3:
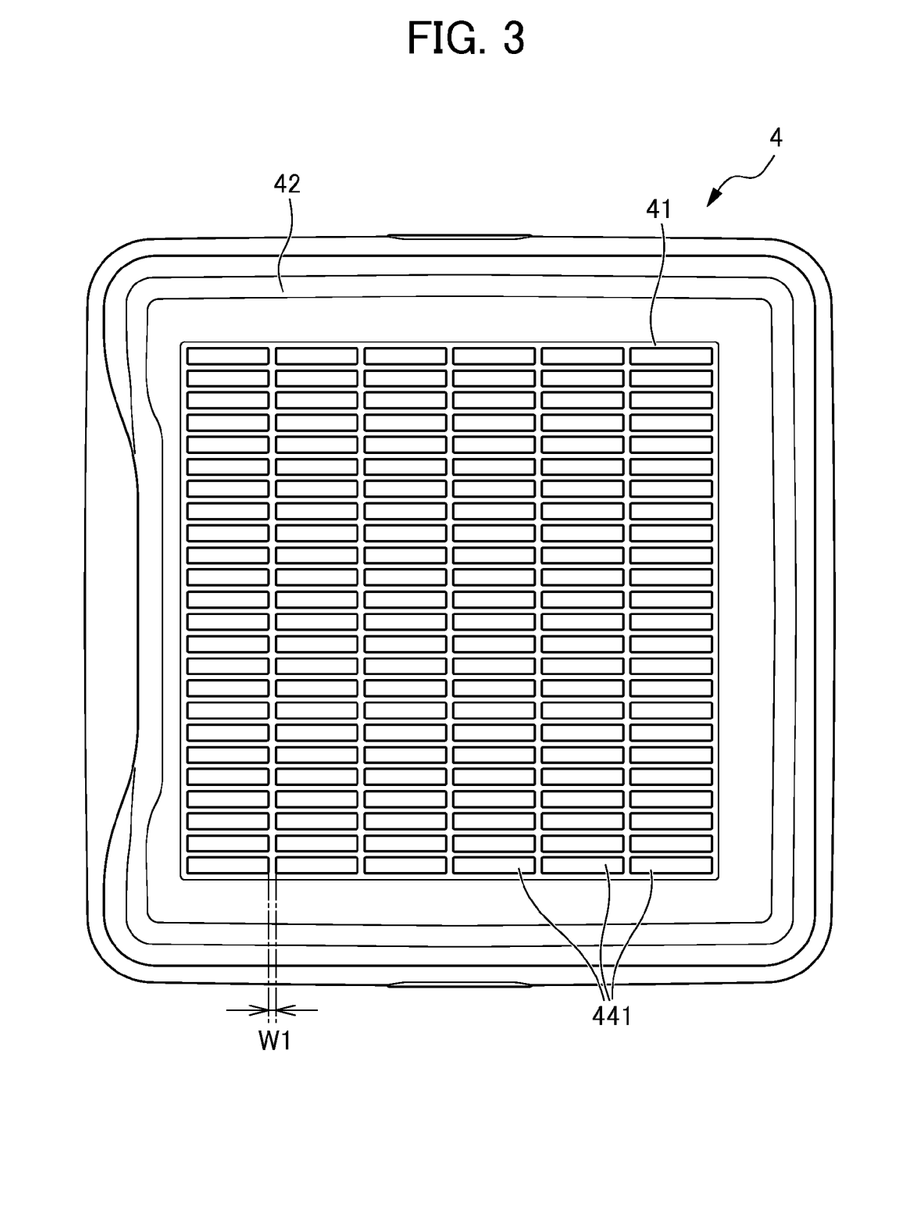
FIG. 3 is a plan view of the system toilet for animals with the liquid-permeable panel removed in the system toilet for animals according to the present embodiment.

As illustrated in FIG. 2 and FIG. 3, the upper receptacle 4 is configured with an open upper surface. The upper receptacle 4 includes a support section 41 that is configured with a substantially square bottom surface when viewed in plan, and four upper side wall sections 42 that rise with a predetermined rise angle with respect to the support section 41 respectively from the four sides of the support section 41.

As illustrated in FIG. 3, the support section 41 has a lattice-shaped configuration that includes a plurality of through holes 441, and exhibits permeable characteristics in relation to a liquid such as urine. The plurality of through holes 441 is configured in a rectangular shape, and is disposed respectively with a predetermined interval in relation to the directions of the rows and columns.

The dimensions of the plurality of through holes 441 preferably are a length on one side of 1 mm to 100 mm and more preferably 10 mm to 60 mm in light of maintaining suitable liquid-permeable characteristics.

The width W1 of the lattice-shaped section in the support section 41 (as illustrated in FIG. 3) is preferably 1 mm to 10 mm, and more preferably 2 mm to 6 mm in order to maintain suitable liquid permeable characteristics and maintain the strength of the support section 41.

The thickness D1 of the support section 41 (illustrated in FIG. 4) is preferably 1 mm to 10 mm in order to maintain the strength of the support section 41.

The height of three upper side wall sections 42 of the four upper side wall sections 42 is configured to be substantially equal. A gateway part 43 is formed on one of the upper side wall sections 42a of the four upper side wall sections 42 and is configured with a height that is less than the height of the other three upper side wall sections 42. An animal that uses the system toilet 1 for animals may enter and leave the upper receptacle 4 from the gateway part 43.

The excrement receptacle 2 and the upper receptacle 4 may be configured by use of various materials such as woods, metals, or plastics. Of such materials, the use of a plastic is preferred in light of the problem of the production of an offensive smell resulting from seepage of excrement into the inner portion of the material, or the problem of corrosion caused by excrement. The plastic may include a material such as polyethylene, polypropylene, vinyl chloride resin, polystyrene, an ABS resin, an AS resin, polyester resin (polyethylene terephthalate or the like), a polyamide resin, and a polycarbonate resin or the like.

As illustrated in FIG. 1 and FIG. 2, the liquid-permeable panel 3 is disposed on the upper surface side of the support section 41 of the upper receptacle 4 and covers substantially the whole region on the upper surface of the support section 41. In the present embodiment, the liquid-permeable panel 3 is formed in an elongated shape that is approximately half of the size of the support section 41, and the upper surface of the support section 41 is covered with two liquid-permeable panels 3. The longitudinal direction of the liquid-permeable panel 3 is disposed along the direction of extension of the upper side wall section 42a forming the gateway port 43 of the upper receptacle 4.

The liquid-permeable panel 3 described above includes predetermined liquid-permeable characteristics, water-absorption characteristics, and deodorizing characteristics. The details of the liquid-permeable panel 3 will be described below.

Figure 4:
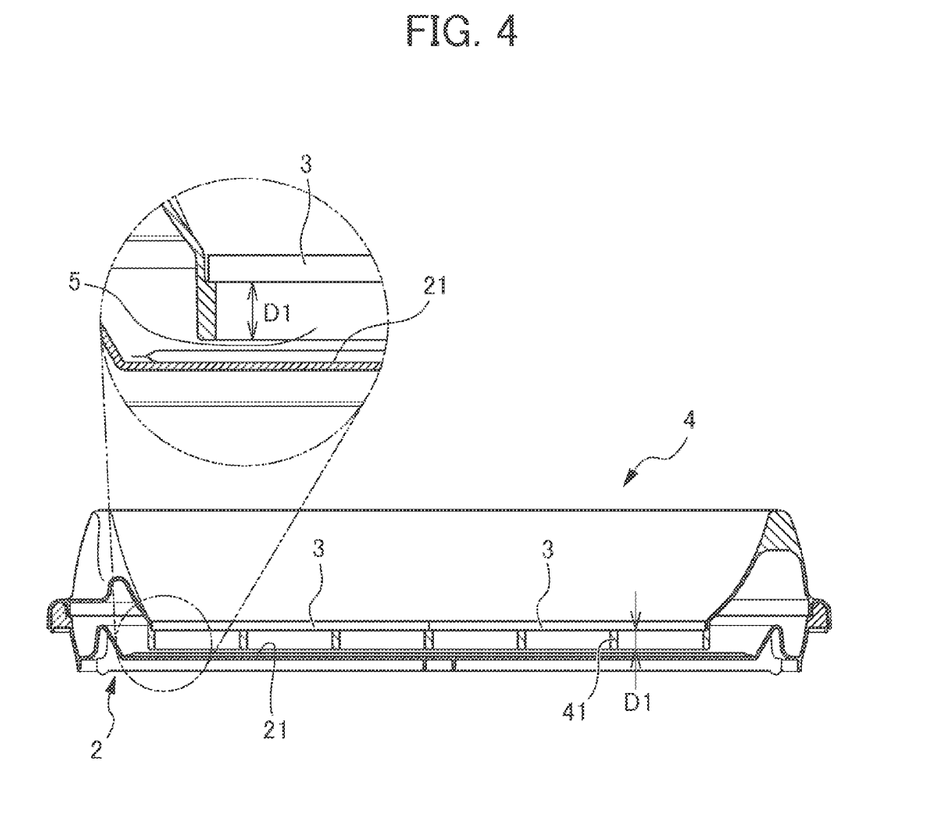
FIG. 4 is a sectional view of a system toilet for animals along the line A-A in FIG. 1 of the system toilet for animals according to the present embodiment.

As illustrated in FIG. 2 and FIG. 4, the system toilet 1 for animals as described above disposes the upper receptacle 4 on an upper section of the excrement receptacle 2 in a state in which the liquid-absorbent sheet 6 is contained in the excrement containment section 21 and is used by mounting the liquid-permeable panel 3 on the support section 41 of the upper receptacle 4.

As illustrated in FIG. 4, in this state, the support section 41 is disposed between the excrement containment section 21 and the liquid-permeable panel 3, and therefore a predetermined space 5 is formed between the excrement containment section 21 and the liquid-permeable panel 3.

The excrement containment section 21 in the excrement receptacle 2 may include a retractable tray that is insertable or retractable in a horizontal direction in the bottom section of the excrement receptacle 2. The retractable tray in this configuration is used either by containing excrement, or is used with the liquid-absorbent sheet 6 laid in an inner section of the retractable tray. Cleaning of the excrement containment section 21 is extremely easy due to provision of the retractable tray. It is preferred to provide a handle to facilitate removal of the retractable tray from the excrement receptacle 2. There is no particular limitation on the shape of the handle as long as the retractable tray can be gripped.

There is no particular limitation in relation to the shape of the opening on the upper section of the excrement receptacle 2, and selection is possible from a variety of shapes including square, rectangular, trapezoid, oval, circular, or semicircular shapes. The shape of the opening on the upper section of the excrement receptacle 2 is preferably square or rectangular to thereby avoid waste of material when cutting and processing the liquid-permeable panel 3 from a large water-absorbent panel in view of design.

Disposable Liquid-Permeable Panel

Next, the disposable liquid-permeable panel 3 will be described. The liquid-permeable panel 3 is configured overall as a flat panel, and as illustrated in FIG. 1 and FIG. 2, is configured to be detachable with respect to the upper receptacle 4 to thereby cover substantially the whole surface of the open section of the excrement receptacle 2.

The panel that configures the liquid-permeable panel employs the materials having superior permeation of excrement, and preferably predetermined water-absorbent characteristics. An actual example of a material that has such performance characteristics is paper made from pulp or the like, and preferably corrugated cardboard.

Although the thickness of the liquid-permeable panel 3 differs in response to the configuration of the panel and the material used in the panel, typically the thickness is configured as 3 mm to 25 mm, and preferably 3 mm to 10 mm. When the thickness of the liquid-permeable panel 3 is excessively small, passage of excrement into the excrement containment section 21 is prevented by deformation of the panel, and there is a risk that the panel may be ruptured by the weight of the animal. When the thickness of the liquid-permeable panel 3 is excessively large, the absorption amount of excrement of the liquid-permeable panel 3 from a single excretion is increased and thereby shortens the exchange cycle and bulkiness is increased when storing the panel for use in exchange operations.

Figure 5:
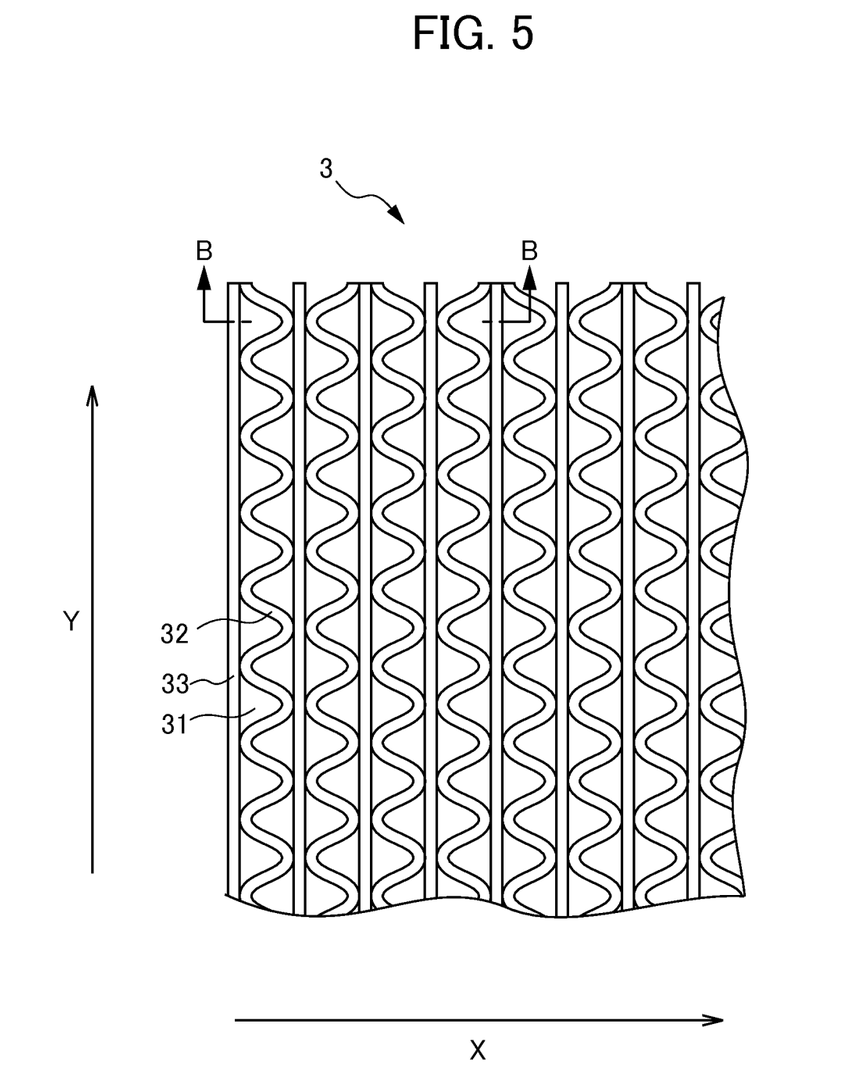
FIG. 5 is an upper view of a liquid-permeable panel used in the system toilet for animals according to the present embodiment.

As illustrated in FIG. 5, the liquid-permeable panel 3 preferably includes a plurality of holes 31 that penetrates in the direction of thickness and enables passage of excrement through the plurality of holes 31 in the direction of thickness of the liquid-permeable panel 3. The shape and the surface area of the openings of the plurality of holes may be the same or different. In comparison to a panel that is provided with holes that extend in an irregular direction such as a sponge material, the liquid-permeable panel 3 that includes the plurality of holes 31 facilitates a reduction in the amount of residual excrement in the inner portion of the disposable liquid-permeable panel 3 and suppresses wetting of the animal feet due to the animal standing on the liquid-permeable panel 3.

When the liquid-permeable panel 3 includes a plurality of holes 31 that penetrate in the thickness direction of the liquid-permeable panel 3, the average surface area of the openings of the plurality of holes 31 is preferably 10 $mm^2$/hole (unit) to 100 $mm^2$/hole, and more preferably 15 $mm^2$/hole to 60 $mm^2$/hole. When the average surface area of the openings of the plurality of holes 31 is excessively small, the amount of excrement that attaches to the liquid-permeable panel 3 increases and suppression of wetting of the feet of the animal becomes difficult. An excessively large average surface area of the openings of the plurality of holes 31 is not preferred since there is a need to increase the thickness of the liquid-permeable panel 3 to impart sufficient strength to the liquid-permeable panel 3. There is no particular limitation in relation to the measurement method of the average surface area of the openings of the plurality of holes 31, and various methods may be used. For example, measurement can be performed using a method of image analysis of a photograph of the openings.

A liquid-permeable panel 3 with a corrugated honeycomb structure is preferred in light of facilitating manufacture and cost-effective acquisition. The corrugated honeycomb structure imparts the liquid-permeable panel 3 with a plurality of holes 31 that penetrate in the thickness direction.

Figure 6:
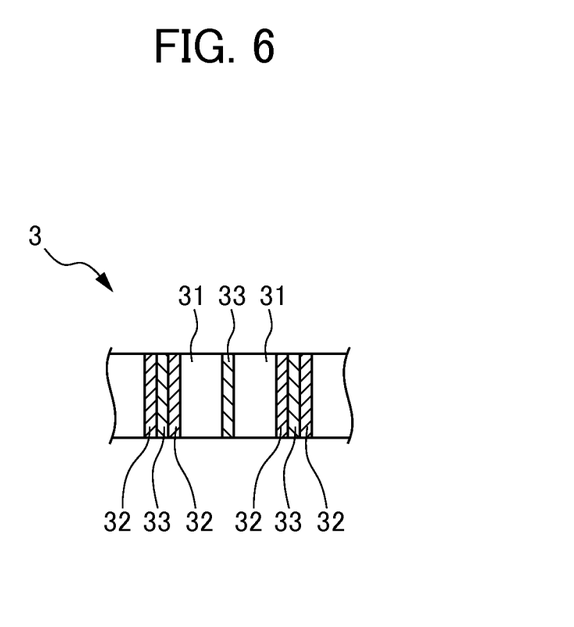
FIG. 6 is a sectional view of the liquid-permeable panel 3 along the line B-B in FIG. 5 of the liquid-permeable panel used in the system toilet for animals according to the present embodiment.

The liquid-permeable panel 3 having a corrugated honeycomb structure will be described below in detail making reference to FIG. 5 and FIG. 6. Firstly, a corrugated sheet 32 and a flat sheet 33 are bonded to thereby manufacture a liquid-permeable panel 3 having a corrugated honeycomb structure. The corrugations of the corrugated sheet 32 are imparted to a material by use of a machine termed a corrugator. There is no particular limitation on the method of bonding the corrugated sheet 32 and the flat sheet 33, and suitable selection may be made from various bonding methods such as a bonding method that uses an adhesive agent. However a resin-based adhesive agent with strong water resistance is preferred.

Next, a member formed by bonding the corrugated sheet 32 and the flat sheet 33 is adhered in a plurality of laminated layers. It is preferred that this configuration also uses adhesion with a resin-based adhesive agent with strong water resistance. In this manner, a block obtained by laminating the member obtained by bonding the corrugated sheet 32 and the flat sheet 33 is cut to a suitable size in a direction that is parallel to the direction of penetration of the holes 31. The liquid-permeable panel 3 having a corrugated honeycomb structure is completed by slicing in a suitable thickness that is perpendicular to the direction of penetration of the holes 31. The completed liquid-permeable panel 3 having a corrugated honeycomb structure includes holes 31 enclosed by the corrugated sheet 32 and the flat sheet 33.

Bending Tendency of Liquid-Permeable Panel

Figure 7:
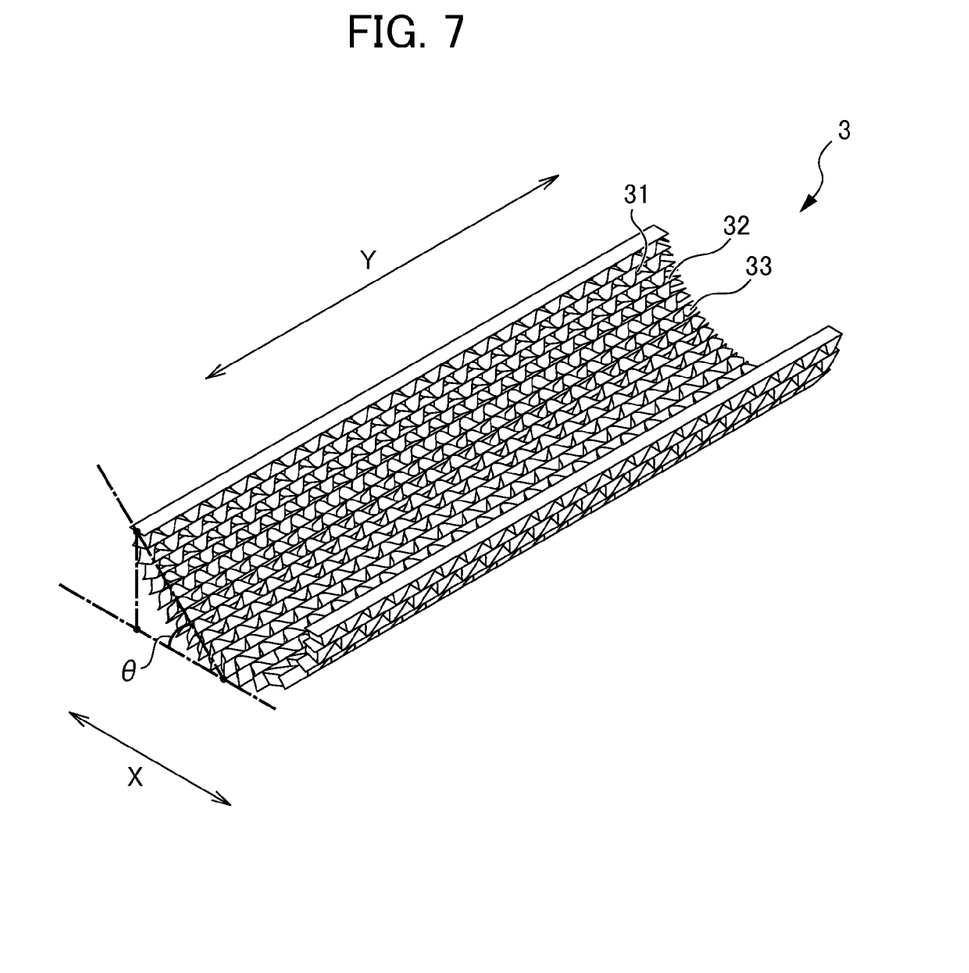
FIG. 7 is a perspective view illustrating the configuration in which the liquid-permeable panel used in a system toilet for animals according to the present invention is bent into a shape that is adapted for disposal of feces.

The bending tendency of the liquid-permeable panel 3 is determined by reference to the 15-degree bending strength (simply referred to below as "bending strength") in the present embodiment. More specifically, this is determined using a method in the bending strength experiments described below in the examples. An angle of 15 degrees in the present embodiment is a value identified as an experimental value by the present inventors as an angle that is sufficient and necessary to obtain a bending of the panel configured to prevent falling and dropping of feces. The bending strength in the present embodiment is preferably at least 0.2N and no greater than 10 N, and more preferably at least 0.2 N and no greater than 3.5 N. When disposing of feces of a dog or the like that have been excreted onto the liquid-permeable panel 3 by use of the liquid-permeable panel 3 that has this bending tendency, the liquid-permeable panel 3 as illustrated in FIG. 7 exhibits a suitable bending along the direction X to thereby form a concavity. In this manner, dropping of feces during conveying can be prevented and disposal of the feces can be facilitated. When less than 0.2 N, the force is too low to obtain proper bending, and when more than 10 N, bending becomes difficult, and there are problems associated with bending by use of normal hand strength.

Although the absolute height from the horizontal line including the top point of the concave section of a sectional view of the bending concave section to the line linking both sides also depends on the width in the X direction of the liquid-permeable panel, it is preferably at least 10 mm and no greater than 50 mm. In this configuration, falling and dropping of feces from both sides due to failure of retention by the concave section can be prevented.

As illustrated in FIG. 7, the liquid-permeable panel 3 is a panel that has a corrugated honeycomb structure with a predetermined thickness that is obtained by cutting a porous corrugated block formed by lamination of the corrugated sheet and the flat sheet with reference to a direction that is perpendicular to the direction of penetration of the holes. The bending direction X at this time is preferably a direction that is orthogonal to the direction of disposition of the flat sheet when the liquid-permeable panel is viewed in plan. Anisotropic characteristics may result in the X direction and the Y direction of the corrugated honeycomb structure. In FIG. 7, a structure is adopted in which bending is inhibited along the direction of disposition of the flat sheet (Y direction) and is facilitated along the X direction that is orthogonal to the Y direction, and is particularly adapted for use in the present embodiment.

In FIG. 7, the longitudinal direction of the liquid-permeable panel 3 is configured as the Y direction and the transverse direction is configured as the X direction. The transverse direction is configured as the bending direction of preferably at least 100 mm to no greater than 300 mm, and bending is enabled by simply gripping both sides with one hand.

Load Enabling Retention of Bending Shape by Liquid-Permeable Panel

In relation to a load at which the bending configuration of the liquid-permeable panel 3 can be retained as illustrated in FIG. 7, a bending shape retention withstand load measured using the method for the bending shape retention withstand load experiments in the examples below is preferably at least 50 g and no greater than 200 g, and more preferably at least 100 g and no greater than 150 g. The disclosure "cannot retain a bending shape" in the invention of this application means that the liquid-permeable panel 3 in a bent state using one hand as illustrated in FIG. 7 has a bending angle that is less than 15 degrees as illustrated in FIG. 7 due to the load of feces or the like, or has the bent state along the axial direction Y to intersect perpendicularly with the bending direction. (when deformed into a concavity along a bending direction that is orthogonal to the direction of both sides of the liquid-permeable panel, the bending angle is the angle subtended by the horizontal line containing the bottom-most point of the concave portion and the oblique line linking that bottom-most point with either of the two sides, that is to say, the angle θ in FIG. 7.) In this configuration, it is not possible to prevent falling of feces during when conveying feces for disposal. Normally, the weight of feces during a single excretion by a dog is no greater than 50 g. By using a liquid-permeable panel that is imparted with a bending shape retention withstand load in the above range in which the bending shape is retainable, the bending shape can be retained even in relation to a load resulting from the weight of feces when managing of the feces of a dog or the like that has excreted onto the liquid-permeable panel 3. As a result, it is possible to prevent falling of feces during conveying operations.

Water-Absorbent Characteristics and Liquid Permeation Rate of Liquid-Permeable Panel The liquid permeation rate of the liquid-permeable panel 3 is preferably at least 90% and still more preferably at least 93%. Use of the disposable liquid-permeable panel 3 that has the above liquid permeation rate enables a reduction in the attachment of urine to the liquid-permeable panel 3 after excretion and inhibits wetting of the feet of the animal due to standing or dispersion of urine in the inner section. The liquid permeation rate of the liquid-permeable panel 3 may be measured by the following method in the examples described below.

The liquid-permeable panel 3 has water-absorbent characteristics of 10 to 50%/min and more preferably 15 to 40%/min. The use of the liquid-permeable panel 3 that has water-absorbent characteristics enables the absorption by the liquid-permeable panel 3 of the small amount of attached excrement after passage of the majority of the excrement and therefore suppresses wetting of the feet of the animal. When the water-absorbent characteristics of the liquid-permeable panel 3 are excessively strong, a large amount of the excrement is absorbed by the liquid-permeable panel 3 during passage of the excrement, and the feet tend to become wetted by seepage of excrement caused by the animal standing at the position of excretion. When the water-absorbent characteristics of the liquid-permeable panel 3 are excessively low, residual attached excrement is present on the liquid-permeable panel 3 in a liquid state and there is a tendency for the feet to become wetted. The water-absorbent characteristics of the liquid-permeable panel 3 can be measured using the method described in the examples below.

The configuration of the liquid-permeable panel 3 used in the system toilet 1 for animals prevents falling during disposal by conveying feces of a dog or the like excreted onto the liquid-permeable panel 3, and therefore simple disposal of feces is enabled.

Furthermore, the majority of the urine passes through the liquid-permeable panel 3 to the excrement containment section 21 and a small amount of excrement attached to the liquid-permeable panel 3 is absorbed. Therefore, wetting of the feet by excrement can be conspicuously suppressed. The liquid-permeable panel 3 preferably prevents wetting of the portion with which the bottom of the feet of the animal makes contact. According to the present embodiment, since almost all the excrement passes through the liquid-permeable panel 3 and almost all of the excrement remaining on the liquid-permeable panel 3 is absorbed by the liquid-permeable panel 3, repeated excretion is possible at the same position. Therefore, since the liquid-permeable panel 3 is configured detachably with respect to the upper receptacle 4, even when soiled by absorption of urine or blockage with feces, simple exchange is possible, and cleaning operations of the system toilet 1 for animals are extremely easy.

Furthermore as illustrated in FIG. 4, a space 5 is formed between the liquid-permeable panel 3 and the excrement containment section 21. Consequently, even when a large amount of urine discharge is present, the urine passes through the holes 31 in the liquid-permeable panel 3, disperses on the rear surface, and then is absorbed by the liquid-absorbent sheet 6. In other words, separated by the space 5, backflow of the urine and overflow of the holes causing residual urine on the surface of the liquid-permeable panel 3 can be effectively prevented. In this manner, wetting of the feet of the animal can be suppressed.

The system toilet 1 for animals according to the present invention is not limited to the above embodiments, and suitable modifications may be implemented to a degree that does not depart from the spirit of the invention. For example, a hood of a desired shape may be provided on the upper section of the excrement receptacle 2 in the system toilet for animals according to the above embodiment. The provision of the hood prevents soiling to the circumference of the system toilet 1 for animals resulting from fly of excrement on the surface of the liquid-permeable panel 3.

The corrugated sheet 32 in the liquid-permeable panel 3 of the system toilet 1 for animals according to the present embodiment is configured as a curved sheet. However the corrugated sheet 32 may be configured as a sheet that is folded in a zigzag configuration. The shape of the opening of the holes 31 is not limited to the above, and for example, may be hexagonal or circular. An arbitrary shape may be suitably selected as long as the dimensions of the opening fall within the predetermined range described above and the holes penetrate in the thickness direction.

In substitution for the lattice-shaped porous plate that configures the support section 41 of the system toilet 1 for animals according to the present embodiment, a punching plate provided with regular circular openings, a porous plate provided with a plurality of parallel slits, or a reticulated plate may be used.

The system toilet 1 for animals according to the present invention may be used as a toilet for animals that are kept as a pet such as a dog, cat or a rabbit, and in particular is suitably used as a toilet for a dog that is kept indoors.

EXAMPLES

Although the present invention is described in detail hereafter making reference to the examples, the present invention is not thereby limited to the examples.

Example 1

Comparative Example 1

Bending strength experiments and bending shape retention withstand load experiments were performed in relation to a paper-based liquid-permeable panel material and a pee pad in accordance with the following method.

Paper-based liquid-permeable panel (Example 1): an A-flute single-sided cardboard formed from ONBS water-resistant base paper commercially available from Oji Itagami Co., Ltd. (basis weight 180 g/m$^2$) is laminated, cut and processed into a corrugated honeycomb configuration illustrated in FIG. 5. The average surface area of the holes 31 is 16 mm$^2$/hole.

Pee Pad (Comparative Example 1): A non-woven fabric is used in relation to the top sheet and a polyethylene air-impermeable film is used on the back sheet. An absorbent body that is interposed between the top sheet and the back sheet is formed by laminating tissue onto a body in which a highly absorbent polymer is contained in pulp.

Bending Strength Experiment (1) A sample cut into 15 cm×15 cm is suspended between rectangular mounting bases having a height of 10 cm and disposed at an interval of 7 cm. The center line of the sample and the center line between the mounting bases are positioned to overlap when viewed in plan.

(2) The sample is bent by application of a load at a velocity of 500 mm/min to the central section of the liquid-permeable panel using a round plunger of which the tip has a diameter of 8 mm.

(3) When the sample is deformed into a concavity along the bending direction, the angle formed by a horizontal line that contains the bottommost point of the concavity and an oblique line linking the bottommost point and either of both the sides in a sectional view of the concavity, that is to say, the angle θ illustrated in FIG. 7, is taken as the bending angle of the sample hereinafter. The load (N) required to bend to a bending angle of 15-degrees (hereinafter referred to as a 15 degree bending strength) is measured on five occasions using a digital force gauge to thereby calculate an average value. In Example 1, measurement of bending along both directions in the X direction (lamination direction) and the Y direction (non-lamination direction) illustrated in FIG. 5 is performed. In Comparative Example 1, measurement of bending is performed along two directions (direction 1, direction 2) parallel to each side of the sample when cut into a square shape. The measurement results are shown in Table 1.

TABLE 1

| (Results of 15-Degree Bending Strength Experiments) | | | |
|---|---|---|---|
| | Example 1(N) | | Comparative Example 1(N) |
| | Lamination direction | Non-lamination direction ※ | Direction 1 | Direction 2 |
| 1 | 3.53 | 13.44 | 0.00 | 0.00 |
| 2 | 4.89 | 12.98 | 0.00 | 0.00 |
| 3 | 3.79 | 13.36 | 0.00 | 0.00 |
| 4 | 2.68 | 11.81 | 0.00 | 0.00 |
| 5 | 3.34 | 13.60 | 0.00 | 0.00 |
| Average | 3.65 | 13.04 | 0.00 | 0.00 |

※ In non-lamination direction, sample ruptured prior to bending angle reaching 15 degrees when load applied at the various value of 1 to 5.

Table 1 demonstrates that a paper-based liquid-permeable panel bends to a suitable degree in the direction of lamination but does not bend in relation to the direction of non-lamination. The pee pad in Comparative Example 1 is confirmed to exhibit no 15-degree bending strength in any direction.

Bending Shape Retention Withstand Load Experiments

The following experiments were conducted only in relation to a configuration that was bent along a direction of lamination in Example 1 in which a bending shape was formed.

(1) A sample in Example 1 having dimensions of 185 mm×370 mm in which the direction along the short side is the direction of lamination and the direction along the long side is the direction of non-lamination is bent along the direction of lamination and one end is held with one hand so that the bending angle on the side opposite to the side gripped with the hand is 15 degrees.

(2) A weight is placed in a central section within 12 cm from the side end of the sample on the opposite side to that gripped with the hand.

(3) A load at which the sample cannot maintain a state of a bending angle of 15 degrees (hereinafter referred to as bending shape retention withstand load) is confirmed. The measurement results performed in relation to experiments using five samples are shown in Table 2. The respective materials 1-5 were incapable of retaining a configuration of a bending angle of 15 degrees in relation to a load indicated by "X" in the table.

(4) The disclosure "incapable of retaining a configuration of a bending angle of 15 degrees" means a configuration in which the bending angle of the sample is smaller than 15 degrees and the load prevents enablement of a bending configuration with a single hand, or a configuration in which bending occurs along an axial direction that intersects in a perpendicular configuration with the bending direction at the portion gripped by the hand.

TABLE 2

(Results of Bending Shape Retention Withstand Load Experiments)

| Load | 50 g | 100 g | 140 g | 150 g | 160 g | 170 g | 180 g | 190 g | 200 g |
|---|---|---|---|---|---|---|---|---|---|
| 1 | o | o | o | o | o | o | o | o | x |
| 2 | o | o | o | o | x |   |   |   |   |
| 3 | o | o | o | o | o | o | o | x |   |
| 4 | o | o | o | x |   |   |   |   |   |
| 5 | o | o | o | o | o | o | o | o | x |

Table 2 demonstrates that the paper-based liquid-permeable panel material in Example 1 enables retention of a bending shape in relation to a load of 140 g to 150 g.

Examples 2-5

Comparative Examples 2-3

The panel material is subjected to experiments to investigate the relationship between bending strength and the bending shape retention withstand load in a method as described below.

Example 2

Five sheets of normal paper (copying paper) (basis weight 67 g/m$^2$) were used as a material for a panel having a bending strength of 0.3 N.

Example 3

Eight sheets of normal paper (copying paper) (basis weight 67 g/m$^2$) were used as a material for a panel having a bending strength of 0.5 N.

Example 4

One sheet of a corrugated honeycomb panel (basis weight 180 g/m$^2$) (thickness 5 mm) was used as a material for a panel having a bending strength of 3.5 N.

Example 5

Two sheets of a corrugated honeycomb panel (basis weight 180 g/m$^2$) (thickness 5 mm) was used as a material for a panel having a bending strength of 10.0 N.

Comparative Example 2

One sheet of a normal paper (copying paper) (basis weight 67 g/m$^2$) was used as a material for a panel having a bending strength of 0.1 N.

Comparative Example 3

One sheet of paper board (600 g/m$^2$) was used as a material for a panel having a bending strength of 15.0 N.

The bending shape retention withstand load used in the Examples and the Comparative Examples is measured using the same method as the bending shape retention withstand load described above. Standards for Bending Tendency
5: Bends extremely easily
4: Bends easily
3: Bends fairly easily
2: Bends with some difficulty
1: Bends with difficulty Table 3 uses the above five standards to illustrate the relationship between the bending tendency and the bending shape retention withstand load.

TABLE 3

|   | Bending strength (N) | Bending tendency | Bending shape retention withstand load (g) |
|---|---|---|---|
| Comparative Example 2 | 0.1 | 5 | 20 |
| Example 2 | 0.3 | 5 | 100 |
| Example 3 | 0.5 | 4 | 140 |
| Example 4 | 3.5 | 3 | 140 |
| Example 5 | 10 | 2 | 200 |
| Comparative Example 3 | 15 | 1 | 300 |

Since the feces weight during a single excretion by a dog is no greater than 50 g, the article used in the Examples preferably has a bending shape retention withstand load that exceeds 50 g. Table 3 demonstrates that the panel in Comparative Example 2 does not satisfy the required conditions. Furthermore, although the bending shape retention withstand load of the panel in Comparative Example 3 is sufficient, preferred conditions for the Examples are not satisfied in relation to bending tendency.

Table 3 demonstrates that the liquid-permeable panel according to the Examples preferably has a 15-degree bending strength of at least 0.2 N and no greater than 10 N, and more preferably at least 0.2 N and no greater than 3.5 N.

Artificial urine having the following composition is used in the Reference Example, Example 6, Example 7 and Comparative Example 4 described below.
Composition of Artificial Urine
Urea 400 g
Sodium chloride 160 g
Magnesium sulfate (heptahydrate) 16 g
Calcium chloride (dihydrate) 6 g
Adjust above with water to make total of 20 L.
Add 2 g of Blue No. 1 to add color to adjusted liquid.

Reference Example

An experiment was conducted using the following method to reproduce the soiling of a room due to wetting of the feet of an animal when urine is excreted onto a plastic draining board.
Experimental Method for Soiling by Wetting of Feet
A plastic draining board having the following features was used.
The plastic draining board: mesh tray (polypropylene, shape of openings: vertical 6 mm×horizontal 6 mm, horizontal crosspiece thickness: 3.5 mm, vertical crosspiece thickness 3.5 mm).
A circular cylinder having an inner diameter 60 mm is placed on the draining board and 30 ml of artificial urine is dripped uniformly onto an inner side of the circular cylinder. A urethane hemisphere having a diameter of 18 mm is pressed into contact with the water drops remaining on the draining board, and the hemisphere is stamped onto filter paper (two types in accordance with JIS P3801). The diameter of the largest stain of artificial urine on the filter paper is measured. The same experiment is conducted five times per position with reference to three positions (A-C) on the draining board. The measurement results for soiling by feet wetting are shown in Table 4.

TABLE 4

| Test position | Number of experiments | Diameter of artificial urine stain |
|---|---|---|
| A | 1 | 8 mm |
|   | 2 | 9 mm |
|   | 3 | 13 mm |
|   | 4 | 12 mm |
|   | 5 | 12 mm |
| B | 1 | 7 mm |
|   | 2 | 10 mm |
|   | 3 | 13 mm |
|   | 4 | 10 mm |
|   | 5 | 10 mm |
| C | 1 | 11.5 mm |
|   | 2 | 15 mm |
|   | 3 | 15 mm |
|   | 4 | 16 mm |
|   | 5 | 10 mm |
| Average Value |   | 11.43 mm |

The experiment conducted in the reference example demonstrates that a soiling stain caused by urine having a diameter of 11.43 mm is formed on the floor surface when it is assumed that the excretion amount of urine on a single occasion is 30 ml and the animal excretes onto the plastic draining board. In this manner, it can be seen that soiling of the room occurs by reason of wetting of the feet with urine in the toilet for animals according to the reference example.

Example 6, Example 7, and Comparative Example 4

In accordance with the method described below, a liquid permeation rate experiment, a water-absorption experiment, and a feet wetting experiment (experiment to evaluate the tendency for wetting of the feet) were conducted on respectively five occasions in relation to the following paper-based liquid-permeable panel material, the non-woven fabric liquid-permeable panel material, and a plastic draining board. The results for the liquid permeation rate experiments are shown in Table 5, the results for the water-absorption experiments are shown in Table 6 and the results for the feet wetting experiments are shown in Table 7.

Liquid-Permeable Panel Material

Paper-based Liquid-Permeable Panel (Example 6): New Rencoat is used as a base paper and an A-flute cardboard is processed into a corrugated honeycomb structure (basis weight 130 g/m$^2$) with an average surface area of the hole openings of 16 mm$^2$/hole. Non-Woven Fabric Liquid-Permeable Panel (Example 7): A deodorizing paper using polyester fibers containing activated carbon is used as a base paper, and an A-flute cardboard is processed into a corrugated honeycomb structure (basis weight 210 g/m$^2$), the average surface area of the hole openings is 10.5 mm$^2$/hole, and includes 4.8% addition of a paraffin-based hydrophobic agent.

The plastic draining board (Comparative Example 4): mesh tray (polypropylene, shape of openings: vertical 6 mm×horizontal 6 mm, horizontal crosspiece thickness: 3.5 mm, vertical crosspiece thickness 3.5 mm).

Liquid Permeation Rate Experiment

A tray that has a premeasured weight (A) is placed below a sample for measurement of the liquid permeation rate. The weight of artificial urine (B) is measured by measurement of approximately 30 ml of artificial urine. A circular cylinder having an inner diameter 60 mm is placed on the sample and artificial urine is dripped uniformly onto an inner side of the circular cylinder. The weight (C) of the tray containing the artificial urine is measured upon stopping of the liquid drops of artificial urine from the sample. The value for the liquid permeation rate is calculated using the formula below.

Formula for Calculation of Liquid Permeation Rate $$\text{Liquid Permeation Rate (\%)} = (\text{weight }(C) - \text{weight }(A)) \div \text{weight }(B) \times 100$$

Water-Absorbent Characteristics Experiment

The weight (A) of material used for the disposable liquid-permeable panel 3 is cut into a 5 cm×5 cm sample and measured. The cut sample is immersed into artificial urine for one minute. After immersion for one minute, the sample is removed, the urine attached to the surface is wiped off, and the weight (B) of each sample is measured. The value for the water-absorption ratio is calculated using the following formula.

Water-Absorbent Characteristics Formula $$\text{Absorption (\%/min)} = (\text{weight }(B) - \text{weight }(A)) \div \text{weight }(A) \times 100$$

Feet Wetting Experiment

A circular cylinder having an inner diameter 60 mm is placed on the sample of the disposable liquid-permeable panel 3, and 30 ml of artificial urine is dripped uniformly onto an inner side. After dripping of the artificial urine, the cylinder is removed and allowed to stand for 30 minutes. The weight (A) of 10 cm×10 cm sheets of filter paper (two types in accordance with JIS P3801) is measured. After 30 minutes, the 10 cm×10 cm sheets of filter paper are placed on the position of dripping of artificial urine on the material of liquid-permeable panel 3, and allowed to stand for 5 seconds. After 5 seconds, the filter paper is removed, and the weight of the filter paper (B) is measured. The experimental results for feet wetting are calculated using the following formula.

Feet Wetting Calculation Formula $$\text{Feet Wetting }(g) = \text{weight }(B) - \text{weight }(A).$$

TABLE 5

(Results of Permeation Rate Experiments)

|  | Example 6 Paper-based liquid-permeable panel | Example 7 Non-woven fabric liquid-permeable panel | Comparative Example 4 Plastic draining board |
|---|---|---|---|
| First Time | 95.3% | 90.8% | 96.6% |
| Second Time | 95.9% | 93.1% | 99.6% |
| Third Time | 95.2% | 93.2% | 96.0% |
| Fourth Time | 95.2% | 93.8% | 96.1% |
| Fifth Time | 93.0% | 93.2% | 95.7% |
| Average Value | 94.9% | 92.8% | 96.8% |

TABLE 6

(Results for Water-Absorption Experiments)

|  | Example 6 Paper-based liquid-permeable panel | Example 7 Non-woven fabric liquid-permeable panel | Comparative Example 4 Plastic draining board |
|---|---|---|---|
| First Time | 39.7%/min | 29.2%/min | 0.0%/min |
| Second Time | 24.2%/min | 36.0%/min | 0.0%/min |
| Third Time | 28.4%/min | 38.7%/min | 0.0%/min |
| Fourth Time | 31.5%/min | 36.9%/min | 0.0%/min |
| Fifth Time | 17.6%/min | 41.6%/min | 0.0%/min |
| Average value | 28.3%/min | 36.5%/min | 0.0%/min |

TABLE 7

(Results of Feet Wetting Experiments)

|  | Example 6 Paper-based liquid-permeable panel | Example 7 Non-woven fabric liquid-permeable panel | Comparative Example 4 Plastic draining board |
|---|---|---|---|
| First Time | 0.00% | 0.01% | 0.13% |
| Second Time | 0.01% | 0.01% | 0.16% |
| Third Time | 0.00% | 0.11% | 0.11% |
| Fourth Time | 0.01% | 0.03% | 0.17% |
| Fifth Time | 0.02% | 0.00% | 0.11% |
| Average Value | 0.01% | 0.03% | 0.14% |

Comparative Example 4 as illustrated in Table 5 and Table 6 demonstrates that the plastic draining board enables superior passage of artificial urine but absorbs none of artificial urine that failed to permeate. Consequently, the feet wetting experiment demonstrates the result that a large amount of residual artificial urine on the draining board is attached to the filter paper. Therefore, it can be seen that there is no improvement in preventing wetting of the feet of an animal in a toilet for animals in which excretion is performed on a plastic draining board.

On the other hand, it can be seen that the liquid-permeable panel 3 exhibits excellent liquid permeation characteristics in Example 6 and Example 7 that use a liquid-permeable panel 3 formed from a corrugated honeycomb shape formed from paper or a non-woven fabric. Consequently, use of the liquid-permeable panel 3 of Example 6 and Example 7 enables permeation of the liquid-permeable panel 3 by a large amount of artificial urine, and the slight amount of artificial urine that remains on the liquid-permeable panel 3 is absorbed by the liquid-permeable panel 3. Therefore, it can be seen that almost no artificial urine is attached to the filter paper as shown by Table 5 in the feet wetting experiment.

Tables 1 to 7 demonstrate that the paper-based liquid-permeable panel having a corrugated structure exhibits superior liquid-permeable characteristics and water-absorbent characteristics. Furthermore, the liquid-permeable panel according to the present embodiment exhibits suitability as a liquid-permeable panel configured to cover an excrement absorbent portion in a system toilet for animals, and additionally exhibits performance characteristics such as a bending tendency in a direction of lamination and a high shape retention withstand load in a direction of non-lamination. As a result, the liquid-permeable panel according to the present embodiment is suitable as a liquid-permeable panel that covers an excrement absorbent portion of a system toilet for animals and also eases the disposal of feces excreted onto the panel.

The invention claimed is:

1. A system toilet for animals comprising:
   an excrement receptacle that opens at an upper surface and has four side wall sections and a bottom section that extends between the four side wall sections;
   an upper receptacle that is disposed on an upper section of the excrement receptacle;
   a support section forming a bottom face of the upper receptacle; and
   a liquid-permeable panel adapted to be mounted on a portion of the upper receptacle on which said liquid-permeable panel an animal stands and the liquid-permeable panel is positioned on the support section of the system toilet so that the liquid-permeable panel is substantially parallel to the bottom section of the excrement receptacle and extends to opposite sides of the support section, wherein a space is formed between a bottom section of the excrement receptacle and a bottom face of the liquid-permeable panel, the liquid-permeable panel including:
   a 15-degree bending strength in one direction of a plan view of the liquid-permeable panel being at least 0.2 N and no greater than 10 N, wherein said 15-degree bending strength is measured by applying a load at a velocity of 500 mm/min to a central section of the liquid-permeable panel from a direction perpendicular to a planar surface using a round plunger of which a tip has a diameter of 8 mm, while both sides that face each other in the plan view of the liquid-permeable panel are being supported, and that deforms the liquid-permeable panel into a shape of a concavity along a bending direction that is orthogonal to a direction of the both sides of the liquid-permeable panel, such that, in a cross section of the concavity, the angle θ formed by a horizontal line that contains a bottommost point of the concavity and an oblique line linking the bottommost point and either of both sides is 15 degrees;
   the liquid-permeable panel having a thickness of 3 to 10 mm;
   a corrugated sheet and a flat sheet laminated alternately;
   a plurality of through holes formed by curved portions of the corrugated sheet, the liquid-permeable panel is placed on the support section such that the through holes penetrate the liquid-permeable panel in a thickness direction of the liquid-permeable panel;
   wherein the both sides of the liquid-permeable panel extend along a direction in which the corrugated sheet and the flat sheet extend and are not laminated, and
   the other sides orthogonal to the both sides extend along the bending direction in which lamination of the corrugated sheet and the flat sheet increase, so that the liquid-permeable panel is bendable in one direction.

2. The system toilet for animals according to claim 1, wherein a bending shape retention withstand load in relation to the direction of the both sides is at least 50 g in a configuration in which a first end of the both sides that face each other is supported, and the concavity is formed such that θ is 15 degrees when viewed in the cross section, said bending shape retention withstand load is i) measured by placing a weight in the central section within 12 cm from a side end of a sample on an opposite side to the first end, such that the load causes θ to be less than 15 degrees when the concavity on the opposite side is viewed in the cross section; or ii) is a load causing a bending configuration along an axial direction to intersect perpendicularly with the bending direction.

3. The system toilet for animals according to claim 1, wherein the liquid-permeable panel has a corrugated honeycomb structure with a predetermined thickness that is obtained by cutting a porous corrugated block formed by lamination of the corrugated sheet and the flat sheet with reference to a direction that is perpendicular to a direction of penetration of the through holes.

4. The system toilet for animals according to claim 1, wherein the system toilet is configured to be used by dogs.

* * * * *